(12) United States Patent
Gneuss et al.

(10) Patent No.: US 8,202,423 B2
(45) Date of Patent: Jun. 19, 2012

(54) MELT FILTER FOR PURIFYING PLASTIC MELTS

(75) Inventors: Stephan Gneuss, Bad Oeynhausen (DE); Daniel Gneuss, Charlotte, NC (US)

(73) Assignee: Gneuss Kunststofftechnik GmbH, Bad Oeynhausen (DE)

( * ) Notice: Subject to any disclaimer, the term of this patent is extended or adjusted under 35 U.S.C. 154(b) by 1057 days.

(21) Appl. No.: 10/582,275

(22) PCT Filed: Dec. 10, 2004

(86) PCT No.: PCT/EP2004/014093
§ 371 (c)(1),
(2), (4) Date: Sep. 12, 2008

(87) PCT Pub. No.: WO2005/056273
PCT Pub. Date: Jun. 23, 2005

(65) Prior Publication Data
US 2008/0314815 A1    Dec. 25, 2008

(30) Foreign Application Priority Data
Dec. 12, 2003   (DE) .................................. 103 58 672

(51) Int. Cl.
B29C 47/68    (2006.01)
B01D 29/01    (2006.01)
B01D 29/05    (2006.01)

(52) U.S. Cl. .................... 210/330; 210/324; 425/199

(58) Field of Classification Search .................... 210/90, 210/230, 324, 325, 330; 425/197, 199
See application file for complete search history.

(56) References Cited

U.S. PATENT DOCUMENTS

| | | | |
|---|---|---|---|
| 5,362,223 A | 11/1994 | Gneuss | 425/185 |
| 5,407,586 A | 4/1995 | Gneuss | 210/780 |
| 5,449,458 A | 9/1995 | Gneuss | 210/330 |
| 5,498,334 A | 3/1996 | Gneuss | 210/236 |
| 6,325,922 B1 * | 12/2001 | Schaller et al. | 210/90 |
| 6,843,915 B2 | 1/2005 | Gneuss | 210/330 |
| 2003/0230527 A1 | 12/2003 | Gneuss | |

FOREIGN PATENT DOCUMENTS

| | | |
|---|---|---|
| DE | 42 35 523 | 12/1993 |
| EP | 0114651 | 8/1984 |
| RU | 1321594 | 7/1997 |

* cited by examiner

*Primary Examiner* — Robert Clemente
(74) *Attorney, Agent, or Firm* — Andrew Wilford

(57) ABSTRACT

A melt filter for cleaning a plastic melt issuing from an extruder has a wheel rotatable about an axis and having an outer rim and a plurality of spokes forming an annular array of axially open spaces, a pair of housing plates axially sandwiching and completely covering the wheel and forming offset from the axis a melt passage extending axially through the wheel at the spaces, and removable filter elements braced axially against the wheel at the spaces between the spokes and angularly movable with the wheel with the melt flowing through the filter elements when same are aligned with the passage. One of the plates being formed with an edge cutout. A part on the one housing plate that can cover and close the cutout during normal operation of the melt filter can open and uncover the cutout for changing the filter element aligned axially with the cutout.

5 Claims, 2 Drawing Sheets

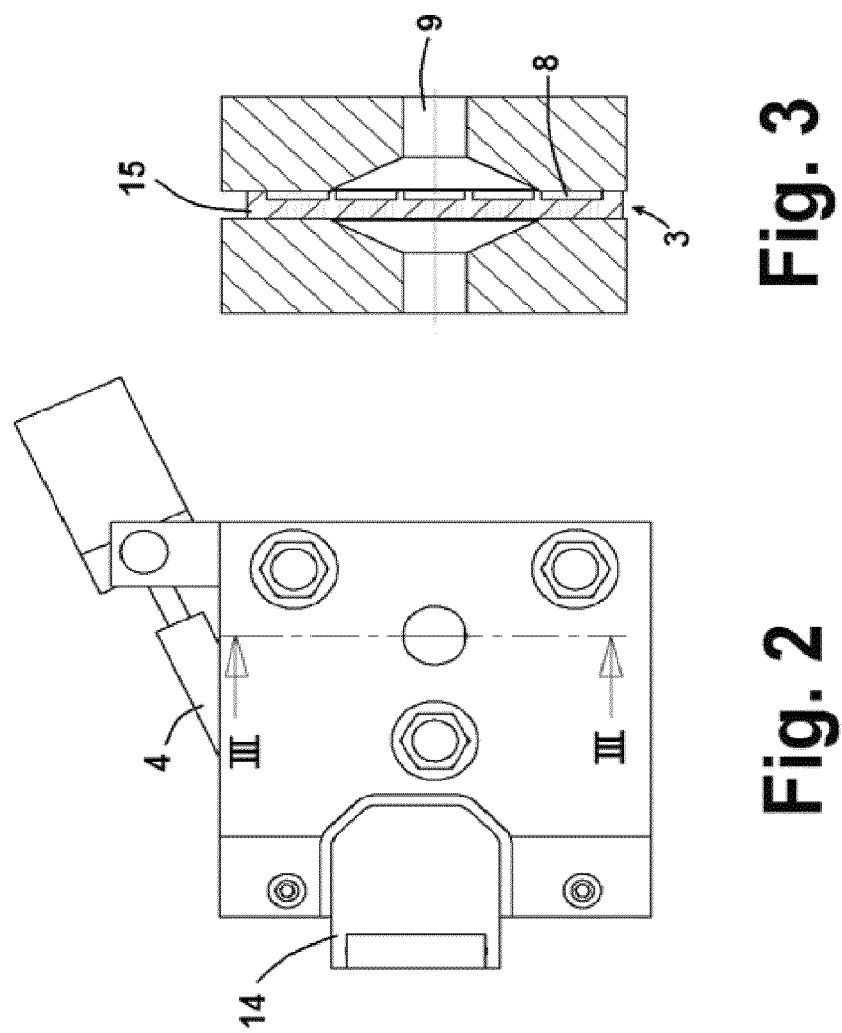

MELT FILTER FOR PURIFYING PLASTIC MELTS

CROSS REFERENCE TO RELATED APPLICATIONS

This application is the US national stage of PCT application PCT/EP2004/014093, filed 10 Dec. 2004, published 23 Jun. 2005 as WO2005/056273, and claiming the priority of German patent application 10358672.5 itself filed 12 Dec. 2003, whose entire disclosures are herewith incorporated by reference.

FIELD OF THE INVENTION

The invention concerns a melt filter for purifying especially plastic melts discharged by extruders, with a filter disk installed between two plates that form a housing equipped with a filter-element-changing station, that can be rotationally driven by a power-driven ratchet drive, and that has spaces separated by spokes and arranged in a circularly annular array for holding exchangeable filter elements supported by perforated disks against the forces that arise due to the pressure drop that occurs in them in the direction of flow of the plastic melt, and with a melt passage that passes through the plates in the area of the circular array, feeds the melt to the filter elements, and widens toward the filter elements.

Prior-art melt filters are described, for example, in EP 0 114 651. However, the previously known melt filter has a very large and thus expensive filter disk, whose filter-element-changing station is also very large, but the surface of the filter disk against which the melt flows is very small, so that extremely poor efficiency results. EP 0 569 866 (U.S. Pat. No. 5,336,223) has already proposed that the melt passage be widened toward the filter elements, so that the melt to be filtered can flow against two filter elements at the same time, but here again, there is no flow against large areas of the filter elements, so that similarly poor efficiency is obtained.

In addition, the teeth on the filter disk have a relatively large pitch, so that, when the filter disk is rotationally stepped, large surfaces of the dirty filter elements are exchanged for correspondingly large surfaces of clean filter elements. This results in pressure differences in the cleaned melt which are unacceptable during further processing of the melt, so that additional pumps are often needed to guarantee constant pressure of the cleaned melt.

It has already been proposed that gear drives that produce smaller steps be used instead of the sturdy, inexpensive ratchet drive in order to exchange only small filter disk areas with dirty filter elements for filter disk areas with clean filters at any given time and thus to ensure constant pressure However, expensive rotational drives of this type constitute an immense cost factor.

DE 42 12 928 (U.S. Pat. No. 5,449,458) has already disclosed a large-surface cover for a filter disk, but large areas of the filter disk are still exposed to ambient air when the filter disk is rotated, so that undesired changes in the plastic can occur.

OBJECT OF THE INVENTION

The object of the invention is to provide a melt filter that is as small as possible, with which hardly any changes occur in the plastic during operation, which guarantees filter element exchange at more or less constant pressure, even at high pressures, and which is nevertheless inexpensive to manufacture.

SUMMARY OF THE INVENTION

To this end, it is proposed that the plates completely cover the filter disk, with at least one of the plates being cut away at the filter-element-changing station, and that the filter-element-changing station be designed larger than one filter element and smaller than or the same size as two filter elements. This results in a housing that encloses, if possible, the whole filter disk and is better able to withstand the high pressures that are required.

It has been found to be effective for at least one of the plates to have a reversibly movable region that covers the filter-element-changing station, for the filter disk to be completely covered during the operation of the filter and closed snugly toward the filter disk, and for the filter-element-changing station to be uncovered for the filter element change to be carried out during the operation of the filter. On the one hand, the complete covering of the filter disk makes it possible to employ higher pressures, and, on the other hand, it is guaranteed that during the operation no plastic melt adhering to the filter disk comes into contact with the ambient air.

It is advantageous that the angular spacing between filter elements against which the melt is flowing and the filter-element-changing station be larger than or the same size as the width of one filter element and a spoke, and smaller than the width of two filter elements and a spoke. This guarantees that melt flows against the largest possible surface area of the filter disk with the smallest possible filter changing station without it being possible for melt to be pressed out of the filter-element-changing station.

Due to these optimum relationships between the size of the filter-element-changing station and the surface of the filter disk against which melt is flowing, the filter disk can be made more compact than the prior-art filter disks and yet make a larger effective filter surface available.

It is advantageous if the ratio of the spoke area against which the melt is flowing to the area of the filter disk through which melt is flowing is less than 18% and greater than 12%. This guarantees that the spokes are provided with dimensions that still enable them to withstand the high pressures but oppose the melt to be filtered with the least possible surface areas that cannot be used for filtration, so that the greatest possible filter surface area can be effectively realized. In this connection, it has been found to be effective if the ratio of the spoke area against which the melt flows, to the area through which the melt flows, is 15±1%.

To be able to guarantee constant pressure during the filter change, it is advantageous that, for each stroke of the ratchet drive, a maximum of 10% of the area of the filter disk against which the plastic melt flows can be exchanged for corresponding filter disk areas with unused filter elements. In this connection, it has been found to be effective if 6±1% of the filter area is exchanged per stroke of the ratchet drive. The exchange of a maximum of 10% of the area of the filter disk, i.e., of the filter elements and the spokes, against which the plastic melt flows guarantees that approximately constant pressure is present in the filtered melt, and this allows trouble-free further processing of the melt in the downstream machines.

BRIEF DESCRIPTION OF THE DRAWING

The invention will now be explained in greater detail with reference to the drawing in which:

FIG. 2 is a small-scale end view of the filter; and
FIG. 3 is a section taken along line III-III of FIG. 2.

SPECIFIC DESCRIPTION

Figure 1:
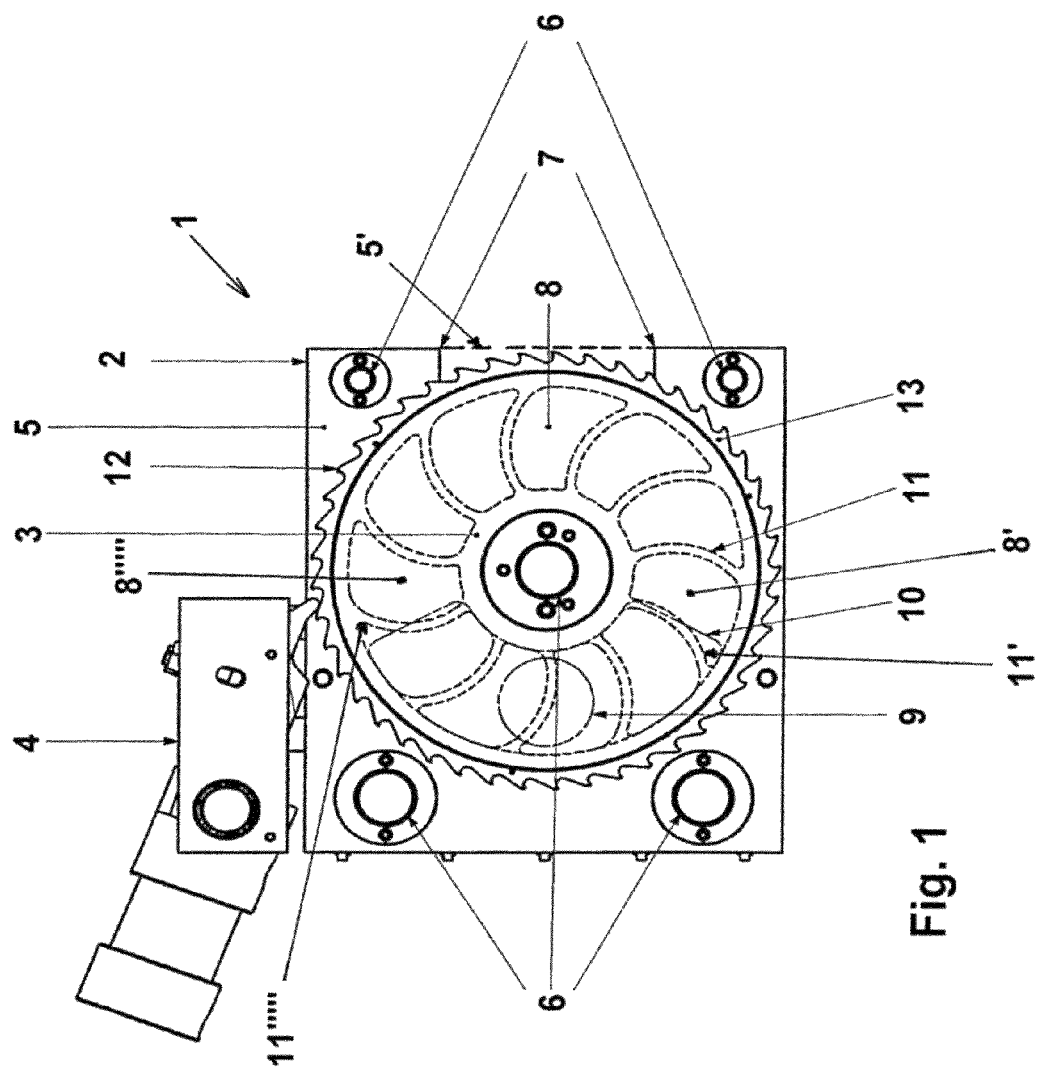
FIG. 1 is a cross section through the filter according to the invention.

The drawing shows a melt filter 1 that consists of a housing 2, a filter disk 3, and a ratchet drive 4. The housing 2 is formed by a plate 5 is connected by fastening devices 6 with another plate 5', whose outline is indicated by a broken line. The plates 5, 5' enclose the filter disk 3 between them and the filter disk 3 is braced against a perforated support disk 15. A filter-element-changing station 7 having a cover 14 is indicated in the plate 5. It is essentially the same size as a single filter element 8. In addition, the plate 5 has a melt passage 9 that widens toward the filter disk 3 in the form of an annular segment 10.

In addition to the filter elements 8, the filter disk 3 has spokes 11. Teeth 12, which interact with the ratchet drive 4, are provided on the periphery of the filter disk 3. The spokes 11 are connected to a wheel rim 13.

Due to the fact that the filter-element-changing station 7 is selected to be as small as possible, most of the filter disk 3 is enclosed by the plates 5. This makes it possible to work with the largest possible pressure in the melt passage without the filter disk 3 jamming in the housing 2. The spokes 11 and the peripheral wheel rim 13 of the filter disk 3 are supported on the plates 5, 5' and seal the melt passage 9 and the annular segment 10 toward the outside.

The annular segment 10 spans the spokes 11' to 11'''' and the filter elements 8' to 8''''. In this regard, as a result of the relationships, in accordance with the invention, between the size of the surface against which the melt is flowing, the distance to the filter-element-changing station, and the size of the filter-element-changing station, an optimum condition is achieved, so that even with a small filter disk 3 at high pressures, the melt can be optimally filtered with a good constant pressure.

The invention claimed is:

1. A melt filter for cleaning a plastic melt issuing from an extruder, the filter comprising:

a wheel rotatable about an axis and having an outer rim and a plurality of spokes forming an annular array of axially open spaces;

a pair of housing plates axially sandwiching and completely covering the wheel and forming offset from the axis a melt passage extending axially through the wheel at the spaces;

removable filter elements braced axially against the wheel at the spaces between the spokes and angularly movable with the wheel with the melt flowing through the filter elements when same are aligned with the passage, one of the plates being formed with an edge cutout of a dimension greater than an angular width of one of the filter elements and smaller or equal to twice this angular width, whereby filter elements can be removed from the wheel at the cutout, an angular spacing between where the melt flows through the wheel and the cutout being at least equal to the angular filter-element width plus an angular dimension of one of the spokes and at most equal to twice the angular filter-element width plus an angular dimension of one of the spokes;

a part on the one housing plate that can cover and close the cutout during normal operation of the melt filter and that can open and uncover the cutout for changing the filter element aligned axially with the cutout; and a ratchet drive engaging the rim and operable to angularly move the wheel about the axis in steps.

2. The melt filter defined in claim 1 wherein an area of a spoke area of the disk against which the melt flows is between 12% and 18% of a total area of the disk.

3. The melt filter defined in claim 1 wherein an area of a spoke area of the disk against which the melt flows is between 14% and 16% of a total area of the disk.

4. The melt filter defined in claim 1 wherein each step of the disk exposes a fresh area of the filter disk equal to at most 10% of a total area of the disk against which the melt flows.

5. The melt filter defined in claim 4 wherein each step of the disk exposes a fresh area of the filter disk equal to between 6% and 7% of a total area of the disk against which the melt flows.

\* \* \* \* \*